United States Patent
Koujimoto et al.

(10) Patent No.: US 10,142,512 B2
(45) Date of Patent: Nov. 27, 2018

(54) SERVER DEVICE, IMAGE PRINTING DEVICE, AND MOVING-IMAGE DATA DELIVERY SYSTEM

(71) Applicant: Dai Nippon Printing Co., Ltd., Tokyo (JP)

(72) Inventors: Mariko Koujimoto, Tokyo (JP); Takahito Tatsumi, Tokyo (JP); Takamasa Akagawa, Tokyo (JP); Jun Yoshida, Tokyo (JP); Koji Otsu, Tokyo (JP); Katsuhisa Yoshida, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/546,115

(22) PCT Filed: Jan. 27, 2016

(86) PCT No.: PCT/JP2016/052299
§ 371 (c)(1),
(2) Date: Oct. 3, 2017

(87) PCT Pub. No.: WO2016/121808
PCT Pub. Date: Aug. 4, 2016

(65) Prior Publication Data
US 2018/0013916 A1    Jan. 11, 2018

(30) Foreign Application Priority Data

Jan. 27, 2015 (JP) ................................. 2015-013379
Mar. 25, 2015 (JP) ................................. 2015-062762

(51) Int. Cl.
*H04M 17/00* (2006.01)
*H04M 1/725* (2006.01)
(Continued)

(52) U.S. Cl.
CPC ............. *H04N 1/387* (2013.01); *G06F 3/017* (2013.01); *G06K 9/4671* (2013.01); *G06Q 30/06* (2013.01);
(Continued)

(58) Field of Classification Search
CPC .... H04N 1/387; H04N 21/274; G06K 9/4671; G06F 3/017; H04M 1/72555; H04M 2250/52; H04M 3/5315; H04M 2017/2575
See application file for complete search history.

(56) References Cited

U.S. PATENT DOCUMENTS

2002/0126160 A1*  9/2002  Miyata ............... H04N 1/00244
                                                     715/838
2003/0038835 A1*  2/2003  DeFelice ................. G06F 1/181
                                                     715/738
(Continued)

FOREIGN PATENT DOCUMENTS

JP    2005-345632 A1    12/2005
JP    2006-013918 A      1/2006
(Continued)

OTHER PUBLICATIONS

International Search Report and Written Opinion (Application No. PCT/JP2016/052299) dated Mar. 29, 2016.
(Continued)

*Primary Examiner* — Andrew Wendell
(74) *Attorney, Agent, or Firm* — Burr & Brown, PLLC

(57) ABSTRACT

A server device transmits picture image data to an image printing device, and transmits, to a portable terminal, moving image data corresponding to the picture image data. The server device includes a storage unit storing the picture image data and the moving image data, a picture-image data transmission unit transmitting the picture image data to the
(Continued)

image printing device, a storage location information transmission unit transmitting storage location information of the moving image data to the image printing device, and a moving-image data transmission unit transmitting the moving image data to the portable terminal that has read, from a printed matter on which the picture image data and a code image obtained by coding the storage location information are printed by the image printing device, the code image, that has acquired the storage location information from the read code image, and that has accessed the server device.

7 Claims, 19 Drawing Sheets

(51) Int. Cl.
    H04N 21/274    (2011.01)
    H04N 1/387     (2006.01)
    G06Q 30/06     (2012.01)
    G06F 3/01      (2006.01)
    G06K 9/46      (2006.01)
    H04N 21/414    (2011.01)
    H04N 21/858    (2011.01)

(52) U.S. Cl.
    CPC ...... *H04M 1/72555* (2013.01); *H04N 21/274* (2013.01); *H04N 21/41407* (2013.01); *H04N 21/858* (2013.01); *H04M 2250/52* (2013.01)

(56) References Cited

U.S. PATENT DOCUMENTS

| 2004/0215477 | A1* | 10/2004 | Martin | G06Q 20/387 |
| | | | | 705/1.1 |
| 2006/0017949 | A1* | 1/2006 | Yada | G06F 3/1206 |
| | | | | 358/1.13 |
| 2008/0052090 | A1* | 2/2008 | Heinemann | G03B 17/53 |
| | | | | 705/16 |
| 2010/0331041 | A1 | 12/2010 | Liao et al. | |
| 2011/0115931 | A1* | 5/2011 | Kulinets | H04N 1/00251 |
| | | | | 348/211.2 |
| 2011/0167075 | A1* | 7/2011 | King | G06F 17/30259 |
| | | | | 707/758 |
| 2011/0173576 | A1 | 7/2011 | Murphy et al. | |
| 2011/0234779 | A1* | 9/2011 | Weisberg | G03B 17/53 |
| | | | | 348/61 |
| 2013/0215475 | A1* | 8/2013 | Noguchi | H04N 1/32106 |
| | | | | 358/448 |
| 2014/0111594 | A1* | 4/2014 | Schuh | B41J 11/42 |
| | | | | 347/218 |
| 2014/0258334 | A1* | 9/2014 | Mukasa | G06F 21/6218 |
| | | | | 707/781 |

FOREIGN PATENT DOCUMENTS

| JP | 2007-135152 A1 | 5/2007 |
| JP | 2007-166265 A1 | 6/2007 |
| JP | 2011-008752 A1 | 1/2011 |
| JP | 2012-503228 A1 | 2/2012 |
| JP | 2013-106257 A1 | 5/2013 |
| WO | 2010/032079 A2 | 3/2010 |

OTHER PUBLICATIONS

Japanese Office Action (with English translation), Japanese Application No. 2015-062762, dated Aug. 30, 2018 (6 pages).

* cited by examiner

FIG. 4

| BOX No. | 001 | 002 |
|---|---|---|
| Storage Location Information | Storage Location U1<br>Storage Location U2<br>⋮ | Storage Location U1<br>Storage Location U2<br>⋮ |
| Solable Quantity | X1 | X2 |
| Number of Image Reproduction Allowed Devices | Y1 | Y2 |
| Picture Image Information | Picture Image P1 | Picture Image P2 |
| Moving Image Information | Moving Image M1 | Moving Image M2 |

FIG. 11

| BOX No. | 001 |
|---|---|
| Storage Location Information | Storage Location U1<br>Storage Location U2<br>• <br>• <br>• |
| Solable Quantity | X1 |
| Number of Image Reproduction Allowed Devices | Y1 |
| Picture Image Information | Picture Image P1 |
| Moving Image Information — Condition 1 | Moving Image M1 |
| Moving Image Information — Condition 2 | Moving Image M2 |
| Moving Image Information — Condition 3 | Moving Image M3 |

FIG. 12

| BOX No. | 001 | | |
|---|---|---|---|
| Storage Location Information | Storage Location U1<br>Storage Location U2<br>．<br>．<br>． | | |
| Solable Quantity | X1 | | |
| Number of Image Reproduction Allowed Devices | Y1 | | |
| Picture Image Information | Picture Image P1 | Picture Image P2 | Picture Image P3 |
| Moving Image Information | Moving Image M1 | Moving Image M2 | Moving Image M3 |

SERVER DEVICE, IMAGE PRINTING DEVICE, AND MOVING-IMAGE DATA DELIVERY SYSTEM

TECHNICAL FIELD

The present invention relates to a server device, an image printing device, and a moving-image data delivery system, which are used to display video content in a portable terminal with the so-called AR technique.

BACKGROUND ART

Image printing devices for reading digital data of images taken by digital cameras, smartphones, etc., and outputting prints of the images are installed at various places. For instance, a user brings, to such a place, a storage medium in which data of images taken by a digital camera is stored, and operates the image printing device to read the image data in the storage medium. The image printing device displays the images of the image data read from the storage medium, and presents those images to the user. The user selects one of the images, which is to be printed, and designates the size and the number of prints. In response, the image printing device prints the image in the designated size and outputs one or more prints. In that type of image printing device, user's needs are diversified and new functions are demanded at every moment.

The AR (Augmented Reality) technique is so far known which is intended to display an image of a virtual object in a superimposed relation to an image of an actual space, the latter image being taken by a portable terminal such as a tablet or a smartphone (see, e.g., Patent Literature (PTL) 1 and 2).

PTL 1: Japanese Unexamined Patent Application Publication No. 2011-8752

PTL 2: Japanese Unexamined Patent Application Publication (Translation of PCT Application) No. 2012-503228

SUMMARY OF INVENTION

The present invention has been accomplished in consideration of the above-mentioned state of the art. An object of the present invention is to provide an image printing device that outputs a printed matter enabling a moving image to be reproduced in a superimposed relation to the printed matter when a user takes a photo of the printed matter by a portable terminal, as well as a server device and a moving-image data delivery system for delivering data of the moving image to the portable terminal.

According to one aspect of the present invention, a moving-image data delivery system includes an image printing device that stores picture image data, and a server device that transmits, to a portable terminal, moving image data corresponding to the picture image data. The image printing device generates storage location information of the moving image data upon accepting an order of purchasing the picture image data, generates a code image by coding the storage location information, and outputs a printed matter by printing a combined image on a sheet of printing paper, the combined image being obtained by combining the picture image data and the code image, and the server device transmits the moving image data to the portable terminal that has read the code image from the printed matter, that has acquired the storage location information from the read code image, and that has accessed the server device.

According to one aspect of the present invention, an image printing device includes a storage unit that stores picture image data, a touch panel that displays sample images of the picture image data, and that accepts an order of purchasing the picture image data, a storage location information generation unit that generates, upon accepting the purchasing order, storage location information of moving image data in a server device, the moving image data corresponding to the picture image data, a coding processing unit that generates a code image by coding the storage location information, an image combining unit that generates a combined image by combining the picture image data and the code image, and a printer that prints out the combined image on a sheet of printing paper.

According to one aspect of the present invention, the storage location information generation unit generates the storage location information by adding an additional digit number, which is different for each purchasing order, to a base number that enables a storage location of the moving image data to be specified.

According to one aspect of the present invention, a server device stores picture image data and moving image data corresponding to the picture image data, and transmits the moving image data to a portable terminal. The server device transmits the moving image data to the portable terminal that has read, from a printed matter on which the picture image data and a code image obtained by coding storage location information of the moving image data are printed, the code image, that has acquired the storage location information from the read code image, and that has accessed the server device.

According to one aspect of the present invention, a moving-image data delivery system includes an image printing device and a server device. The server device transmits picture image data to the image printing device, and transmits, to a portable terminal, moving image data corresponding to the picture image data. The image printing device acquires storage location information of the moving image data from the server device upon accepting an order of purchasing the picture image data, generates a code image by coding the storage location information, and outputs a printed matter by printing a combined image on a sheet of printing paper, the combined image being obtained by combining the picture image data and the code image. The server device transmits the moving image data to the portable terminal that has read the code image from the printed matter, that has acquired the storage location information from the read code image, and that has accessed the server device.

According to one aspect of the present invention, a server device transmits picture image data to an image printing device, and transmits, to a portable terminal, moving image data corresponding to the picture image data. The server device includes a storage unit that stores the picture image data and the moving image data, a picture-image data transmission unit that transmits the picture image data to the image printing device, a storage location information transmission unit that transmits storage location information of the moving image data to the image printing device in response to a request from the image printing device, and a moving-image data transmission unit transmitting the moving image data to the portable terminal that has read, from a printed matter on which the picture image data and a code image obtained by coding the storage location information are printed by the image printing device, the code image, that has acquired the storage location information from the read code image, and that has accessed the server device.

According to one aspect of the present invention, the moving-image data transmission unit transmits the moving image data to the portable terminal when feature points of a picture image read from the printed matter by the portable terminal and feature points of the picture image data stored in the storage unit are in match with each other.

According to one aspect of the present invention, the storage unit stores management information that sets plural kinds of storage location information corresponding to one kind of moving image data, and the storage location information transmission unit transmits a different kind of storage location information in response to each request from the image printing device.

According to one aspect of the present invention, the server device further includes a terminal information acquisition unit that acquires terminal information of portable terminals having accessed the server device. The management information contains an upper limit value set for a number of portable terminals that are allowed to reproduce a moving image by employing one kind of storage location information, and the server device counts, on the basis of the acquired terminal information, a number of portable terminals that have accessed the server device by employing one kind of storage location information, and does no longer transmit the moving image data to a new portable terminal that is going to make an access by employing the same one kind of storage location information after a counted value has reached the upper limit value.

According to one aspect of the present invention, the storage unit stores plural kinds of moving image data corresponding to one kind of moving image data, the management information contains a reproduction condition set for each kind of moving image data, and the moving-image data transmission unit transmits the moving image data, which satisfies the reproduction condition, to the portable terminal.

According to one aspect of the present invention, at least one of access time and a position of the portable terminal is defined as the reproduction condition.

According to one aspect of the present invention, an image printing device includes a storage unit that stores picture image data received from the above described server device, a touch panel that displays sample images of the picture image data, and that accepts an order of purchasing the picture image data, a storage location information acquisition unit that acquires, from the server device, storage location information of moving image data corresponding to the picture image data upon accepting the purchasing order, a coding processing unit that generates a code image by coding the storage location information, an image combining unit that generates a combined image by combining the picture image data and the code image, and a printer that prints out the combined image on a sheet of printing paper.

According to one aspect of the present invention, the image printing device receives printing position information of the code image from the server device, and generates the combined image in accordance with the printing position information.

According to one aspect of the present invention, the sample image displayed on the touch panel includes a dummy code image.

According to one aspect of the present invention, a moving-image data delivery system includes an image printing device that stores picture image data, and a server device that transmits moving image data to a portable terminal. The image printing device generates, upon accepting an order of purchasing the picture image data, storage location information that specifies a location capable of storing moving image data in the server device, generates a code image by coding the storage location information, and outputs a printed matter by printing a combined image on a sheet of printing paper, the combined image being obtained by combining the picture image data and the code image, and the server device accepts registration of moving image data from a first portable terminal that has accessed the server device by employing the storage location information acquired by reading the code image from the printed matter, and after accepting the registration of the moving image data, transmits the registered moving image data to a second portable terminal that has accessed the server device by employing the same storage location information.

According to one aspect of the present invention, an image printing device includes a storage unit that stores picture image data;

a display unit that displays sample images of the picture image data, an accepting unit that accepts an order of purchasing a printed matter published using the picture image data, a storage location information generation unit that generates storage location information, which specifies a location capable of storing moving image data in the server device, upon accepting the purchasing order, a coding processing unit that generates a code image by coding the storage location information, an image combining unit that generates a combined image by combining the picture image data and the code image, and a printer that prints out the combined image on a sheet of printing paper.

According to one aspect of the present invention, the storage location information generation unit generates the storage location information by adding an additional digit number, which is different for each purchasing order, to a base number that specifies the location capable of storing the moving image data.

According to one aspect of the present invention, a server device stores picture image data, accepts registration of moving image data from a portable terminal, and transmits the moving image data to a portable terminal. The server device accepts registration of moving image data from a first portable terminal that has read, from a printed matter on which the picture image data and a code image obtained by coding storage location information specifying a location capable of storing moving image data are printed, the code image, and that has accessed the server device by employing the storage location information acquired by reading the code image, and after accepting the registration of the moving image data, transmits the registered moving image data to a second portable terminal that has accessed the server device by employing the same storage location information.

According to one aspect of the present invention, a moving-image data delivery system includes an image printing device and a server device. The server device transmits picture image data to the image printing device. The image printing device acquires storage location information, which specifies a location capable of storing moving image data, from the server device upon accepting an order of purchasing a printed matter published using the picture image data, generates a code image by coding the storage location information, and outputs the printed matter by printing a combined image on a sheet of printing paper, the combined image being obtained by combining the picture image data and the code image, and the server device accepts registration of moving image data from a first portable terminal that has read the code image from the printed matter, and that has accessed the server device by employing the storage location information acquired by reading the code image, and after accepting the registration of the moving image data, transmits the registered moving image data to a second portable terminal that has accessed the server device by employing the same storage location information.

According to one aspect of the present invention, a server device includes a storage unit that stores picture image data, a picture-image data transmission unit that transmits the picture image data to an image printing device, a storage location information transmission unit that transmits storage location information, which specifies a location capable of storing moving image data, to the image printing device in response to a request from the image printing device, a moving-image data reception unit that receives moving image data from a first portable terminal, and that stores the received moving image data in the storage unit in link with the storage location information, the first portable terminal having read, from a printed matter on which the picture image data and a code image obtained by coding the storage location information are printed by the image printing device, the code image, and having accessed the server device by employing the storage location information acquired by reading the code image, and a moving-image data transmission unit that transmits the moving image data to a second portable terminal having accessed the server device by employing the storage location information after registration of the moving image data.

According to one aspect of the present invention, the moving-image data transmission unit transmits the moving image data to the second portable terminal when feature points of a picture image read from the printed matter by the second portable terminal and feature points of the picture image data stored in the storage unit are in match with each other.

According to one aspect of the present invention, the storage location information transmission unit transmits a different kind of storage location information in response to each request from the image printing device.

According to one aspect of the present invention, the server device acquires terminal information of portable terminals having accessed the server device, counts, on the basis of the acquired terminal information, a number of portable terminals that have accessed the server device by employing one kind of storage location information, and does no longer transmit the moving image data to a new portable terminal that is going to make an access by employing the same one kind of storage location information after a counted value has reached an upper limit value.

According to one aspect of the present invention, an image printing device includes a storage unit that stores picture image data received from the above described server device, a display unit that displays sample images of the picture image data, an accepting unit that accepts an order of purchasing the picture image data, a storage location information acquisition unit that acquires storage location information, which specifies a location capable of storing moving image data, from the server device upon accepting the purchasing order, a coding processing unit that generates a code image by coding the storage location information, an image combining unit that generates a combined image by combining the picture image data and the code image, and a printer that prints out the combined image on a sheet of printing paper.

According to one aspect of the present invention, the image printing device receives printing position information of the code image from the server device, and generates the combined image in accordance with the printing position information.

According to one aspect of the present invention, the sample image displayed on a display unit includes a dummy code image.

Advantageous Effects of Invention

According to the present invention, when a user takes a photo of the printed matter, which is output from the image printing device, with the portable terminal, data of a moving image is delivered to the portable terminal in such a manner that the moving image is reproduced in a superimposed relation to the printed matter.

BRIEF DESCRIPTION OF DRAWINGS

FIG. 4 illustrates an example of management information.
FIG. 11 illustrates an example of management information.
FIG. 12 illustrates an example of management information.

DESCRIPTION OF EMBODIMENTS

Embodiments of the present invention will be described below with reference to the drawings.

First Embodiment

Figure 1:
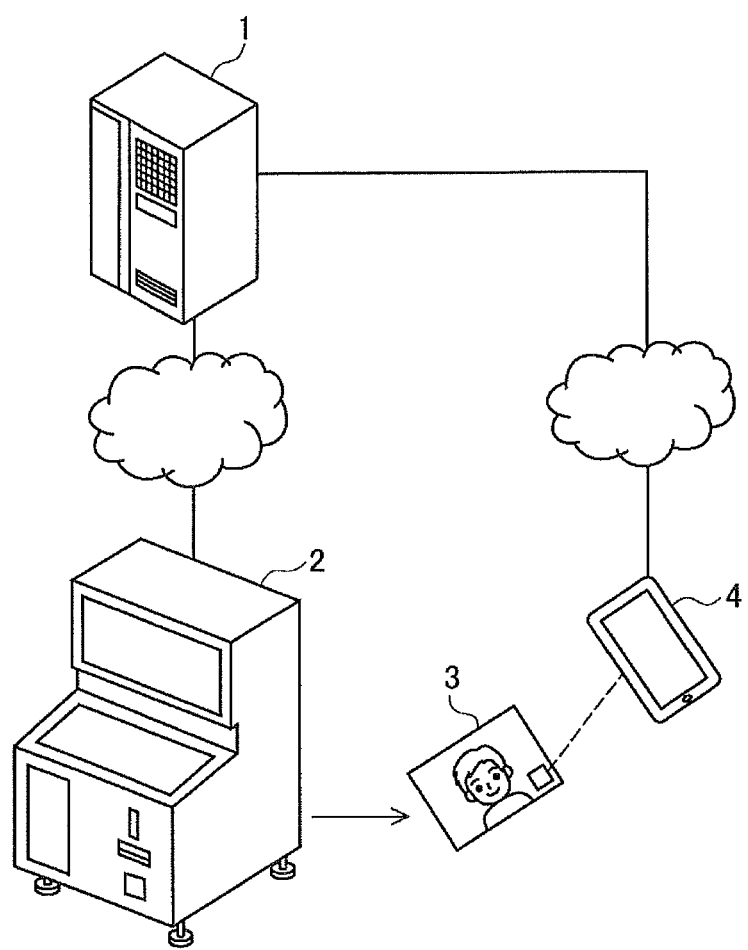
FIG. 1 schematically illustrates a configuration of a moving-image data delivery system according to a first embodiment of the present invention.

FIG. 1 schematically illustrates a configuration of a moving-image data delivery system according to a first embodiment of the present invention. As illustrated in FIG. 1, the moving-image data delivery system includes a server device 1 and an image printing device 2. The server device 1 stores picture image data and moving image data corresponding to the picture image data. The server device 1 transmits, to the image printing device 2, the picture image data and storage location information (e.g., URL) that is used to access the moving image data corresponding to the picture image data.

The picture image data is, for example, data of picture images of persons such as sport athletes and famous persons, animals, cars, etc. The moving image data is data of a moving image representing a series of scenes that an object in the image is moving, speaking, or generating sounds. The following description is made in connection with the case where the picture image data is data of a human image.

Figure 2:
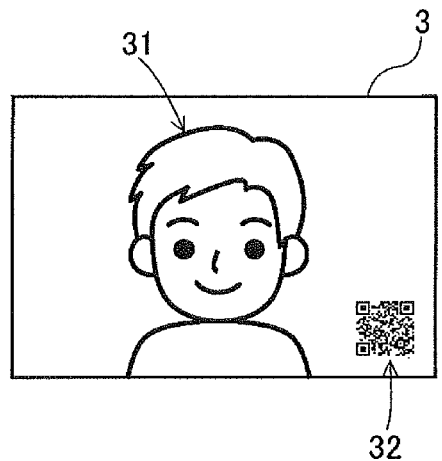
FIG. 2 illustrates an example of a printed matter that is output from an image printing device.

When a fee is paid by the user, the image printing device 2 generates a two-dimensional code by coding the storage location information that has been received from the server device 1. Then, the image printing device 2 combines an image of the two-dimensional code with the human image produced in accordance with the picture image data that has been received from the server device 1. Furthermore, the image printing device 2 prints a combined image on a sheet of printing paper and outputs a printed matter 3. Thus, as illustrated in FIG. 2, the printed matter 3 on which a human image 31 and a two-dimensional code 32 are printed is produced.

The user possesses a portable terminal 4 such as a smartphone or a tablet. The portable terminal 4 stores a program for reproducing data of a moving image (i.e., moving-image reproduction application). When the portable terminal 4 executes the relevant program, a camera function of the portable terminal 4 is started up to read the two-dimensional code. When the user takes an image of the two-dimensional code 32 on the printed matter 3 by a camera in the portable terminal 4, the portable terminal 4 reads the two-dimensional code 32, acquires the storage location information, and accesses the server device 1.

The portable terminal 4 acquires the picture image data from the server device 1, and instructs the user to take a photo of the human image 31 on the printed matter 3 by the camera in the portable terminal 4. When the user takes the photo of the human image 31 by the camera in the portable terminal 4, the portable terminal 4 executes comparison and matching check of feature points between the taken human image 31 and the picture image acquired from the server device 1. If matching between the two images is verified by the matching check, the portable terminal 4 acquires data of a moving image corresponding to the human image 31 from the server device 1, and reproduces the moving image on a display. The known AR technique is utilized to reproduce the moving image, and the moving image is reproduced in a superimposed relation to the printed matter 3 photographed by the camera in the portable terminal 4.

As described above, the moving-image data delivery system sells the printed matter 3 on which the human image 31 and the two-dimensional code 32 are printed by the image printing device 2. The user who has purchased the printed matter 3 can view the moving image corresponding to the human image 31 by reading the two-dimensional code with the portable terminal 4, and by accessing the server device 1 to receive and reproduce the moving image data.

Figure 3:
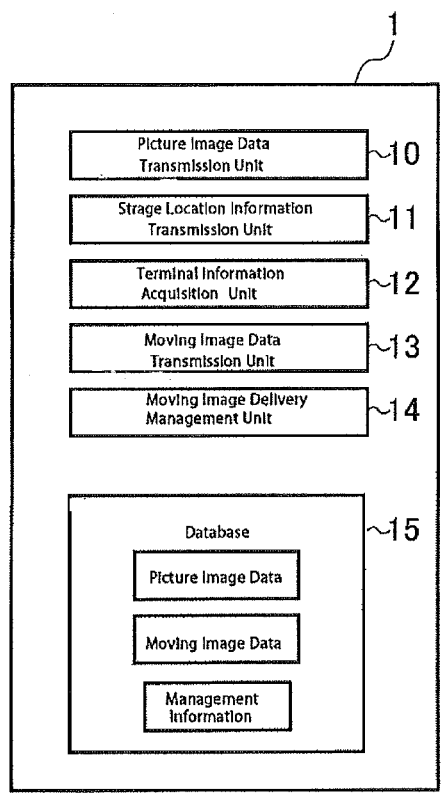
FIG. 3 is a block diagram of a server device.

FIG. 3 is a block diagram of the server device 1. The server device 1 includes a picture-image data transmission unit 10, a storage location information transmission unit 11, a terminal information acquisition unit 12, a moving-image data transmission unit 13, a moving-image delivery management unit 14, and a database 15. The server device 1 is constituted by a computer, for example.

The database (storage unit) 15 stores the picture image data, the moving image data, and management information. The picture image data and the moving image data are provided, for example, from a licenser.

FIG. 4 illustrates an example of the management information. Individual items of the management information are grouped into a plurality of boxes each of which contains the storage location information, a salable quantity, a number of image-reproduction allowed devices, picture image information, and moving image information. Thus, the management information is stored in a state grouped into boxes for each of management units in selling of the picture image and delivery of the moving image.

The salable quantity represents a number of the printed matters 3 available for sale (i.e., an upper limit number). The storage location information is information needed to access the server device 1 when reproducing the moving image. The two-dimensional code 32 resulting from coding the storage location information is printed on the printed matter 3. In image selling corresponding to a box 001, for example, the storage location information is prepared in the same number as a salable quantity X1. Although a number X1 of data of storage location information are given as URL's different from one another, the same box (box 001 here) is referred to through conversion processing inside the server device 1, and the same moving image is reproduced.

In response to a request from the image printing device 2, the storage location information transmission unit 11 transmits one among the plural data of storage location information, the one being not yet transmitted, to the image printing device 2. Therefore, the printed matters 3 sold by the image printing device 2 include the different two-dimensional codes 32 even when the human images 31 on the printed matters 3 are the same.

When the number of the printed matters 3 having been sold reaches the salable quantity, the not-yet-transmitted storage location information does not exist anymore. Accordingly, the server device 1 notifies the image printing device 2 of the fact that the printed matters 3 have been sold out.

The number of image-reproduction allowed devices represents the number of the portable terminals 4 that are allowed to reproduce the moving image with one printed matter 3. More specifically, the terminal information acquisition unit 12 acquires individual identification information of the portable terminal 4 that demands the moving image data. The moving-image delivery management unit 14 stores the storage location information, which has been used by the portable terminal 4 accessing the server device 1, and the individual identification information of the portable terminal 4 in a linked relation, and counts the number of the portable terminals 4 that have accessed the server device 1 by employing the same storage location information. After a counted value has reached the number of image-reproduction allowed devices, the moving-image delivery management unit 14 rejects the reproduction of the moving image data if still another portable terminal 4 tries to make an access by employing the same storage location information.

The salable quantity and the number of image-reproduction allowed devices may be set by the licenser who provides the picture image data and the moving image data. It is also possible not to set the salable quantity, and to set only one data of storage location information. Moreover, the number of image-reproduction allowed devices may not be set.

The picture image information represents information about the picture image data to be sold. The moving image information represents information about the moving image data corresponding to the picture image data.

The picture-image data transmission unit 10 transmits the picture image data to the image printing device 2 and the portable terminal 4. In an example, when the picture image data and the moving image data are registered in the server device 1, the picture-image data transmission unit 10 transmits the registered picture image data to the image printing device 2. Furthermore, when the portable terminal 4 accesses the server device 1 in accordance with the storage location information, the picture-image data transmission unit 10 refers to the picture image information in the box corresponding to the relevant storage location information, and transmits the picture image data to the portable terminal 4. By way of example, when the storage location information is contained in the box 001, the picture-image data transmission unit 10 transmits picture image data P1 to the portable terminal 4. When the storage location information is contained in the box 002, the picture-image data transmission unit 10 transmits picture image data P2 to the portable terminal 4.

The moving-image data transmission unit 13 transmits the moving image data to the portable terminal 4 in response to a request from the portable terminal 4. The moving image data transmitted to the portable terminal 4 corresponds to the picture image data that has been transmitted to the portable terminal 4.

Figure 5:
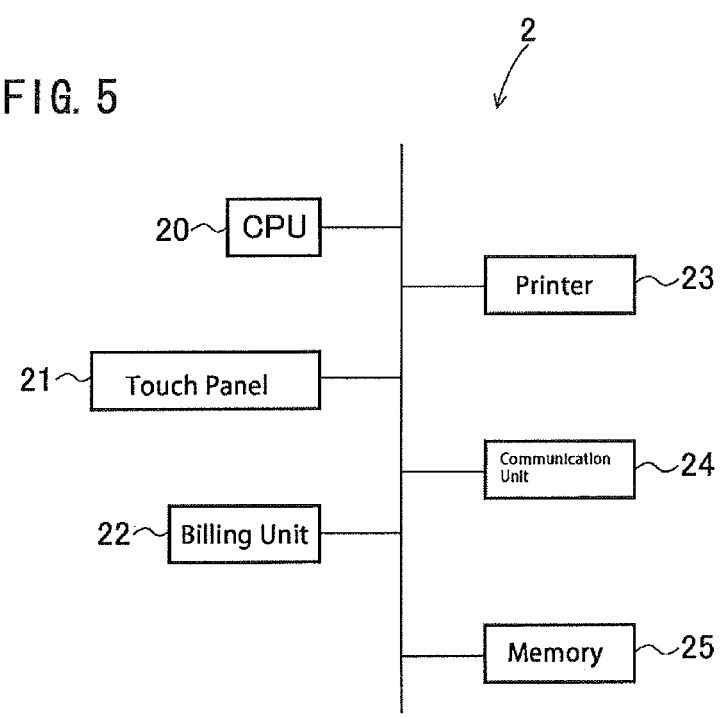
FIG. 5 is a block diagram of the image printing device.

FIG. 5 is a block diagram of the image printing device 2. As illustrated in FIG. 5, the image printing device 2 includes a CPU (Central Processing Unit) 20, a touch panel (display unit or operating unit) 21, a billing unit 22, a printer 23, a communication unit 24, and a memory 25. The image printing device 2 is connected to the server device 1 via the communication unit 24 to be capable of communication between them.

The billing unit 22 identifies and counts moneys that have been put into the image printing device 2, and pays the change. The printer 23 is a high-resolution color printer of sublimation thermal transfer type, for example.

The memory 25 stores a control program, an image selling program, and the picture image data received from the server device 1. The memory 25 includes at least one type of storage medium, such as a flash memory, a hard disk memory, a multimedia card micro-type memory, a card memory (e.g., an SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), or a magnetic memory.

The CPU 20 executes the control program and functions as a control unit for controlling various components of the image printing device 2.

Figure 6:
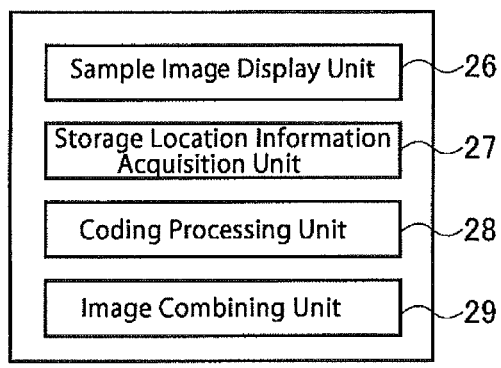
FIG. 6 is a functional block diagram representing function units that are implemented with execution of an image selling program.

As illustrated in FIG. 6, a sample image display unit 26, a storage location information acquisition unit 27, a coding processing unit 28, and an image combining unit 29 are implemented with the CPU 20 executing the image selling program, whereby selling of the printed matter 3 can be started.

Figure 7:
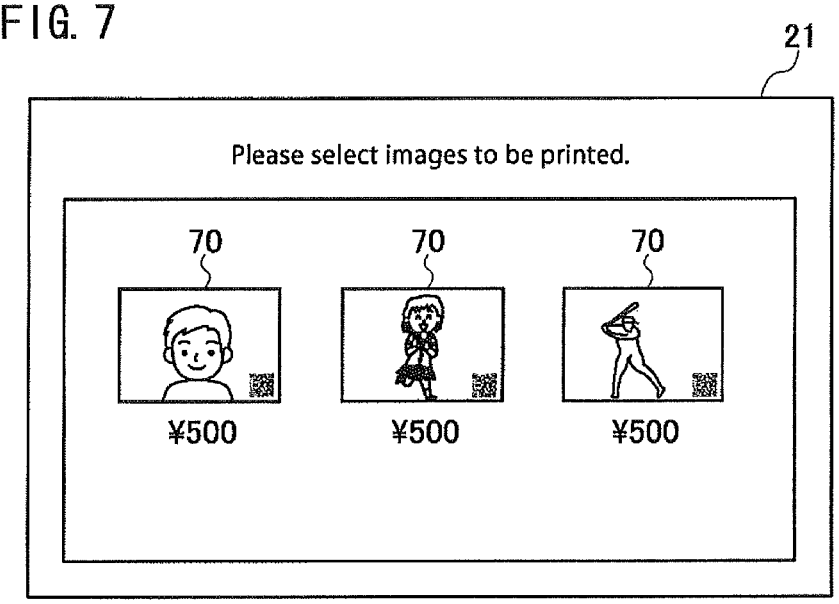
FIG. 7 illustrates an example of a display screen when a user purchases a picture image in the image printing device.

The sample image display unit 26 displays sample images 70 for the printed matter 3 on a touch panel 21, as illustrated in FIG. 7, by employing the picture image data that has been received from the server device 1. When the user selects the picture image to be purchased and pays the fee, the storage location information acquisition unit 27 acquires, from the server device 1, the storage location information corresponding to the purchased picture image.

The coding processing unit 28 generates a two-dimensional code image by coding the storage location information that has been acquired by the storage location information acquisition unit 27. The image combining unit 29 combines the two-dimensional code image with the purchased picture image, thereby generating a combined image. The combined image is printed on a sheet of printing paper by the printer 23, and the printed matter 3 is output.

The image printing device 2 may have function of reading image data, taken by a digital camera, etc., from a storage medium in which the image data is stored, displaying read images on the touch panel 21, accepting selection of any of the displayed images and designation of the print size and the number of prints by the user, and printing out the selected image by the printer 23.

Figure 8:
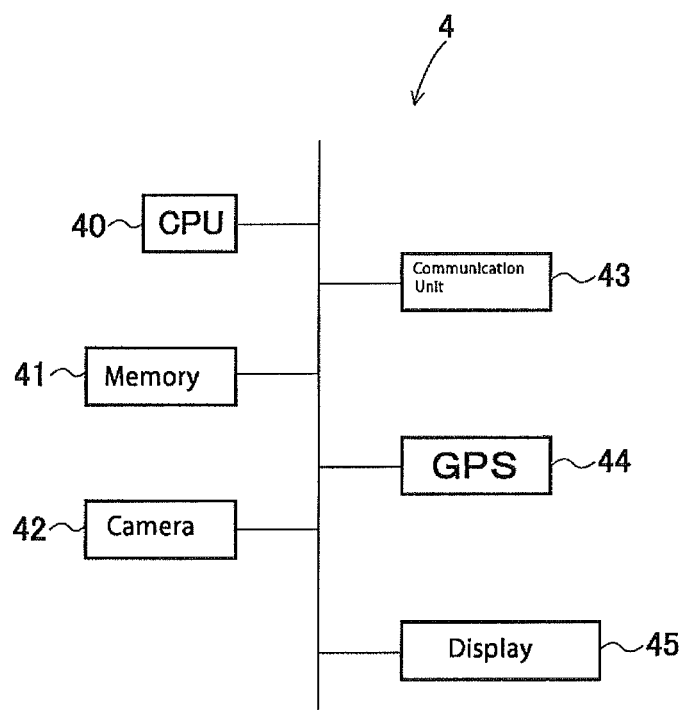
FIG. 8 is a block diagram of a portable terminal.

FIG. 8 is a block diagram of the portable terminal 4. The portable terminal 4 includes a CPU 40, a memory 41, a camera 42, a communication unit 43, a GPS unit 44, and a display (touch panel) 45.

The memory 41 stores the moving-image reproduction application (application program). The memory 41 includes at least one type of storage medium, such as a flash memory, a hard disk memory, a multimedia card micro-type memory, a card memory (e.g., an SD or XD memory), RAM, SRAM, ROM, EEPROM, PROM, or a magnetic memory.

Figure 9:
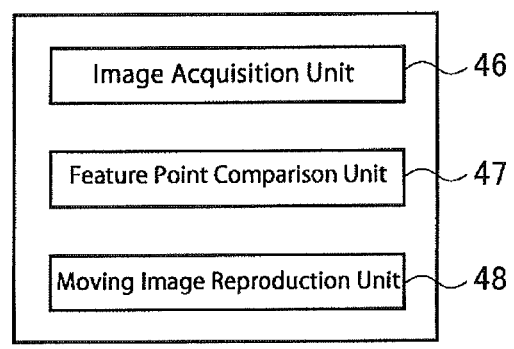
FIG. 9 is a functional block diagram representing function units that are implemented with execution of a moving-image reproducing application.

As illustrated in FIG. 9, an image acquisition unit 46, a feature point comparison unit 47, and a moving-image reproduction unit 48 are implemented with the CPU 40 executing the moving-image reproduction application, thus enabling the moving image to be reproduced.

The image acquisition unit 46 reads the storage location information from the two-dimensional code 32, which is printed on the printed matter 3, with the camera 42, accesses the server device 1 via the communication unit 43, and acquires the picture image data corresponding to the human image 31. In addition, the image acquisition unit 46 acquires the human image 31 with the camera 42.

The feature point comparison unit 47 compares feature points between the picture image acquired from the server device 1 and the human image 31 on the printed matter 3 photographed by the camera 42. If matching of the feature points is verified, the moving-image reproduction unit 48 receives the moving image data from the server device 1. In the case of mismatching of the feature points, a message notifying that the moving image cannot be reproduced is displayed on the display 45.

The moving-image reproduction unit 48 reproduces, by employing the known AR technique, the received moving image data in a superimposed relation to the human image 31 photographed by the camera 42. In an example, positioning between the camera image and the moving image is performed by tracking the feature points of the detected human image 31, and by estimating the position and the posture of the camera 42.

The GPS unit 44 acquires position information of the portable terminal 4, and notifies the position information to the server device 1 in response to a request from the server device 1.

Figure 10:
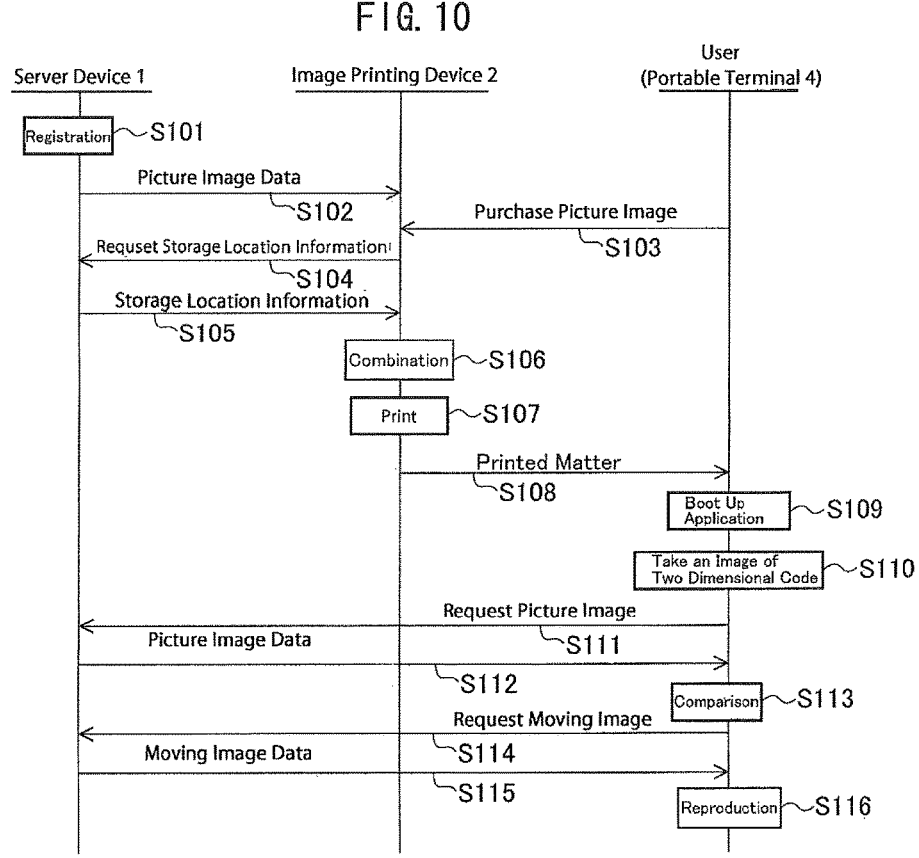
FIG. 10 is a sequence chart referenced to explain a moving-image data delivery method according to the first embodiment.

FIG. 10 is a sequence chart representing flow of processing for image selling and for reproduction of the moving image according to this embodiment. When the picture image to be sold and the moving image are provided from the licenser and the salable quantity and the number of image-reproduction allowed devices are set, the management information containing those items of information is registered in the database 15 (step S101). The server device 1 generates the storage location information in number corresponding to the salable quantity, and loads the generated storage location information in the management information. In response to the registration of the management information, the server device 1 transmits the picture image data to the image printing device 2 (step S102). Timing of transmitting the picture image data to the image printing device 2 from the server device 1 can be set arbitrarily.

The transmitted picture image data is stored in the memory 25. With the storage of the picture image data, the image selling by the image printing device 2 is started. The sample image display unit 26 displays the sample images 70 of the printed matters 3 on the touch panel 21, as illustrated in FIG. 7, by employing the picture image data.

When the user operates the image printing device 2, purchases the picture image, and pays the fee (step S103), the storage location information acquisition unit 27 of the image printing device 2 requests, to the server device 1, the storage location information of the moving image data that corresponds to the purchased picture image data (step S104).

In response to the request from the image printing device 2, the server device 1 refers to the corresponding box of the management information in the database 15, and transmits the storage location information, which has not yet been transmitted, to the image printing device 2 (step S105). In an example, when the management information illustrated in FIG. 4 is stored in the database 15 and the picture image purchased in step S103 is the picture image P1, the server device 1 transmits the storage location information that is included the box 001, and that has not yet been transmitted. A flag indicating "already transmitted" is set on the transmitted storage location information in the management information.

When the image printing device 2 acquires the storage location information from the server device 1, the coding processing unit 28 generates a two-dimensional code image by coding the acquired storage location information. Then, the image combining unit 29 combines the two-dimensional code image with the picture image that has been purchased in step S103, and generates a combined image (step S106).

The printer 23 prints out the combined image on a sheet of printing paper (step S107). Thus, the user can obtain the printed matter 3 on which the human image 31 and the two-dimensional code 32 are printed (step S108).

When the user boots up the moving-image reproduction application in the portable terminal 4, the camera 42 is started up and a prompt for instructing reading of the two-dimensional code is displayed on the display 45 (step S109). The portable terminal 4 acquires the storage location information by taking an image of the two-dimensional code 32 on the printed matter 3 with the camera 42 (step S110).

The image acquisition unit 46 of the portable terminal 4 accesses the server device 1 via the communication unit 43 in accordance with the storage location information, and requests the picture image data (step S111). The server device 1 refers to the box of the management information, which corresponds to the storage location information having been given in the access from the portable terminal 4, and transmits the picture image data to the portable terminal 4 (step S112). In an example, when the storage location information is included the box 001, the server device 1 transmits the picture image data P1 to the portable terminal 4.

When the portable terminal 4 receives the picture image data from the server device 1, a prompt for instructing reading of the human image 31 is displayed on the display 45. When the user takes a photo of the human image 31 on the printed matter 3 by the camera 42, the feature point comparison unit 47 compares feature points between the picture image received from the server device 1 and the human image 31 photographed by the camera 42 (step S113). If matching of the feature points is verified, the portable terminal 4 requests the moving image data to the server device 1 (step S114).

The server device 1 transmits the moving image data corresponding to the picture image data, which has been transmitted to the portable terminal 4 in step S112, to the portable terminal 4 (step S115). In an example, the server device 1 refers to the box 001 of the management information, and transmits the moving image data M1, which corresponds to the picture image data P1, to the portable terminal 4.

When the portable terminal 4 receives the moving image data, the moving-image reproduction unit 48 reproduces, by employing the known AR technique, the moving image data in a superimposed relation to the human image 31 photographed by the camera 42 (step S116). As a result, the moving image is reproduced on the display 45 such that the human image 31 in the printed matter 3 appears as if it starts motion.

Thus, according to this embodiment, with the user taking a photo of the printed matter 3, which is output from the image printing device 2, by the portable terminal 4, the moving image data can be delivered to the portable terminal 4 such that the moving image is reproduced in a superimposed relation to the printed matter 3.

Furthermore, the server device 1 can limit the number of the printed matters 3 to be published and the number of terminals allowed to reproduce the moving image by setting the salable quantity and the number of image-reproduction allowed devices in the management information that is stored as the database 15 in the server device 1. In an example, a commercial value of the printed matter 3 can be increased by limiting the number of the printed matters to be published. In another example, copying and distribution of the printed matter 3 can be suppressed by limiting the number of terminals allowed to reproduce the moving image.

Different moving images may be reproduced depending on the position of the user (i.e., the portable terminal 4) and the time at which the moving image is reproduced. In such a case, as illustrated in FIG. 11, plural types of moving images depending on conditions, such as the position and the time, are defined in the management information. The position of the user (i.e., the portable terminal 4) is acquired by the GPS unit 44. By way of example, when time from 5:00 to 10:00 is set as Condition 1, time from 10:00 to 18:00 is set as Condition 2, and time from 18:00 to 5:00 is set as Condition 3, the moving image to be reproduced can be changed depending on the morning, the noon, and the night.

When a "position" is set as the condition, a particular moving image can be reproduced at a particular place. By reproducing the moving image in an event site, for example, users can view a special moving image in relation to the event.

Conditions set in the management information are not limited to the position and the time. Various kinds of device information (such as a maker, a setting language, a model name, an IP address zone, and a network segment), which can be obtained from the portable terminal 4, may also be set. Identification information for specifying the moving-image reproduction application may be set as one condition in the management information, and the terminal information acquisition unit 12 may acquire the identification information of the moving-image reproduction application that is installed in the portable terminal 4.

As illustrated in FIG. 12, a plurality of images may be set in one box of the management information. A delivery period of the moving image data may be set in the management information. The delivery period of the moving image data may be prolonged with additional billing. In such a case, the delivery period of the moving image data becomes different per storage location information.

The moving-image data delivery system may include the image printing device 2 in a plural number. The server device 1 may set an image selling period for each of the image printing devices 2.

When the sample image display unit 26 displays the sample images 70 on the touch panel 21, it preferably provides the two-dimensional code in each of the sample images 70 as a two-dimensional code on the basis of dummy information. This makes it possible to prevent a fraudulent act of photographing the sample image 70, which is displayed on the touch panel 21, with the portable terminal 4 and reproducing the moving image.

When the server device 1 transmits the storage location information in response to a request from the image printing device 2, the server device 1 may transmit printing position information of the two-dimensional code together. In such a case, the image combining unit 29 combines the two-dimensional code image with the picture image, which has been purchased by the user, and forms the combined image in accordance with the printing position information. By designating the printing position of the two-dimensional code as described above, the two-dimensional code can be printed without degrading quality of the human image. The code printing position information may be determined by the licenser who provides the picture image data. The code printing position information may be transmitted at the same time as when the server device 1 transmits the picture image data to the image printing device 2 (step S102 in FIG. 10).

When the user purchases the same picture image in a plural number, the number of kinds of the storage location information transmitted from the server device 1 to the image printing device 2 may be the same as the number of the purchased picture images, or may be one. When the storage location information is transmitted in the same number as that of the purchased picture images, different two-dimensional codes are printed on the plurality of printed matters 3 to be printed out. When the number of kinds of the storage location information is one, the server device 1 may update the management information so as to increase the number of image-reproduction allowed devices corresponding to the relevant storage location information.

While the above embodiment has been described in connection with an example in which the picture image data is transmitted from the server device 1 to the image printing device 2, the picture image data may be written into the memory 25 of the image printing device 2, for example, by connecting, to the image printing device 2, a storage medium in which the picture image data is stored.

While the above embodiment has been described in connection with an example in which the server device 1 generates the storage location information and transmits the storage location information in response to a request from the image printing device 2, the image printing device 2 may generate (issue) the storage location information and may generate the two-dimensional code image by coding that storage location information. In such a case, the image printing device 2 includes a storage location information generation unit that generates the storage location information by adding an additional digit number to a number (hereinafter called as a "base number") with which the corresponding box in the server device 1 can be referred. By changing the additional digit number each time the picture image is purchased, the printed matters 3 sold in the image printing device 2 include the two-dimensional codes 32 different from one another even though the human images 31 on the printed matters 3 are the same. The storage location information contains the base number that enables the storage location of the moving image data to be specified even though the additional digit number is different. Accordingly, the same box can be referred to through internal processing executed in the server device 1.

When the moving-image data delivery system includes the plurality of image printing devices 2, the additional digit number may include Number ID for each of the image printing devices 2. This enables the image printing devices 2 to generate different kinds of the storage location information.

With the image printing device 2 generating the storage location information as described above, a load for management of the storage location information in the server device 1 can be reduced. Furthermore, the number of the printed matters 3 to be sold can be managed in the image printing device 2 by setting an upper limit of the additional digit number.

The server device 1 is able to limit the number of portable terminals allowed to reproduce the moving image by registering, as part of the management information, the storage location information that has been given in the access from the portable terminal 4, and by utilizing the registered storage location information with reference to the number of image-reproduction allowed devices.

The base number used to generate the storage location information by the image printing device 2 may be notified to the image printing device 2 from the server device 1, or it may be written into the memory 25 by an operator operating the image printing device 2.

Second Embodiment

Figure 13:
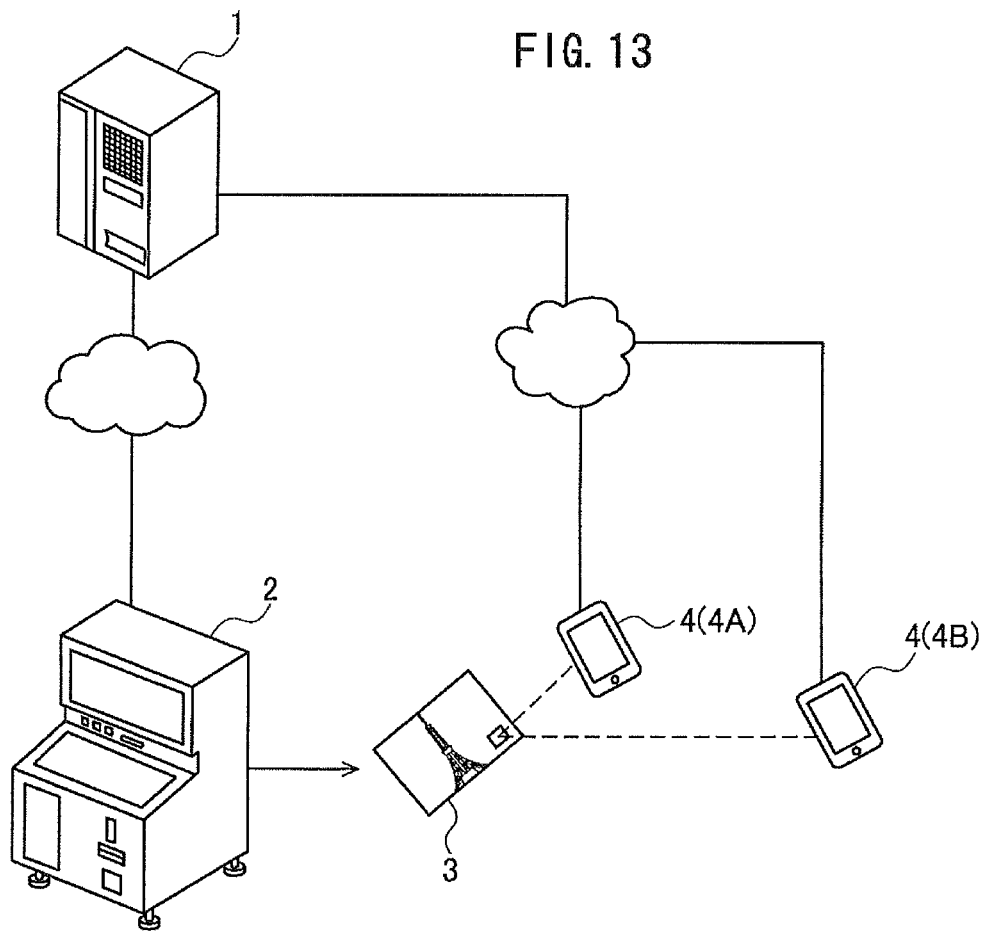
FIG. 13 schematically illustrates a configuration of a moving-image data delivery system according to a second embodiment.

While the above first embodiment has been described in connection with an example in which the picture image and the moving image are provided from the licenser, the moving image may be uploaded by the user himself or herself. FIG. 13 schematically illustrates a configuration of a moving-image data delivery system according to a second embodiment. As illustrated in FIG. 13, the moving-image data delivery system includes a server device 1, an image printing device 2, and portable terminals 4 (4A and 4B). The portable terminals 4 are each, for example, a smartphone or a tablet equipped with a camera and a communication function. The server device 1 stores the picture image data and transmits, to the image printing device 2, the picture image data and information of the storage location (e.g., URL) capable of storing the moving image data in the server device 1. The picture image data is, for example, data of landscape photos of sightseeing spots.

Figure 14:
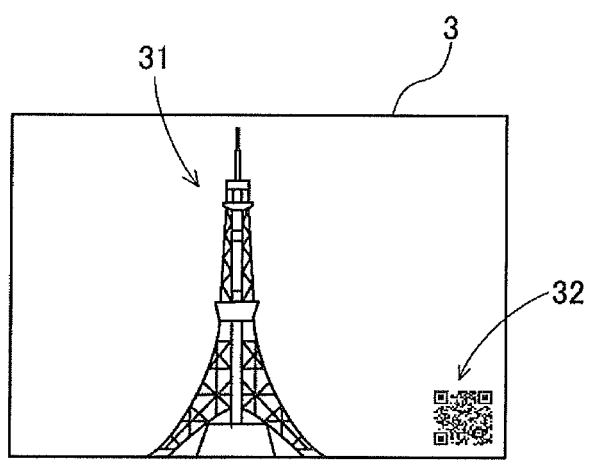
FIG. 14 illustrates an example of a printed matter that is output from an image printing device.

When a fee is paid by the user, the image printing device 2 generates a two-dimensional code by coding the storage location information that has been received from the server device 1. Then, the image printing device 2 combines an image of the two-dimensional code with a picture image received from the server device 1. Furthermore, the image printing device 2 prints a combined image on a sheet of printing paper and outputs a printed matter 3. Thus, as illustrated in FIG. 14, the printed matter 3 on which a picture image (landscape image) 31 and a two-dimensional code 32 are printed is produced.

Each of the portable terminals 4A and 4B possessed by users stores a program for registering (uploading) the moving image data to the server device 1 and reproducing the moving image data (i.e., moving-image registration and reproduction application). When the portable terminal 4A executes the relevant program, a camera function of the portable terminal 4A is started up to read the two-dimensional code. When one of the users takes an image of the two-dimensional code 32 on the printed matter 3 by a camera in the portable terminal 4A, the portable terminal 4A reads the two-dimensional code 32, acquires the storage location information, and accesses the server device 1. Then, the portable terminal 4A registers, in the server device 1, one of plural moving image data stored therein, the one being selected by the user.

After the registration of the moving image data, when the other user operates the portable terminal 4B to execute the above-mentioned program and takes an image of the two-dimensional code 32 on the printed matter 3 by a camera in the portable terminal 4B, the portable terminal 4B reads the two-dimensional code 32, acquires the storage location information, and accesses the server device 1. Then, the portable terminal 4B acquires the picture image data from the server device 1, and instructs the user to take a photo of the picture image 31 on the printed matter 3 by the camera in the portable terminal 4B. When the user takes the photo of the picture image 31 by the camera in the portable terminal 4B, the portable terminal 4B executes comparison and matching check of feature points between the taken picture image 31 and the picture image acquired from the server device 1. If matching between the two images is verified by the matching check, the portable terminal 4B acquires the moving image data stored in a storage area, which is specified by the read storage location information, from the server device 1, and reproduces the moving image on a display. The known AR technique is utilized to reproduce the moving image, and the moving image is reproduced in a superimposed relation to the printed matter 3 photographed by the camera in the portable terminal 4B. The portable terminal 4A and the portable terminal 4B may be the same terminal or different terminals.

As described above, the moving-image data delivery system sells the printed matter 3 on which the picture image 31 and the two-dimensional code 32 are printed by the image printing device 2. One user who has purchased the printed matter 3 reads the two-dimensional code 32 with the portable terminal 4 (4A), and accesses the server device 1 to register and store the moving image data. Thereafter, the other user reads the two-dimensional code 32 with the portable terminal 4 (4B), and accesses the server device 1 to receive and reproduce the registered moving image data. Hence the other user can view the moving image.

Thus, by way of example, a user A can assign the printed matter 3, as a photo with a moving image, to a user B. The user B can access the server device 1 with the aid of the two-dimensional code 32 on the printed matter 3 and enjoy the moving image, which has been registered by the user A, by employing the portable terminal 4.

Figure 15:
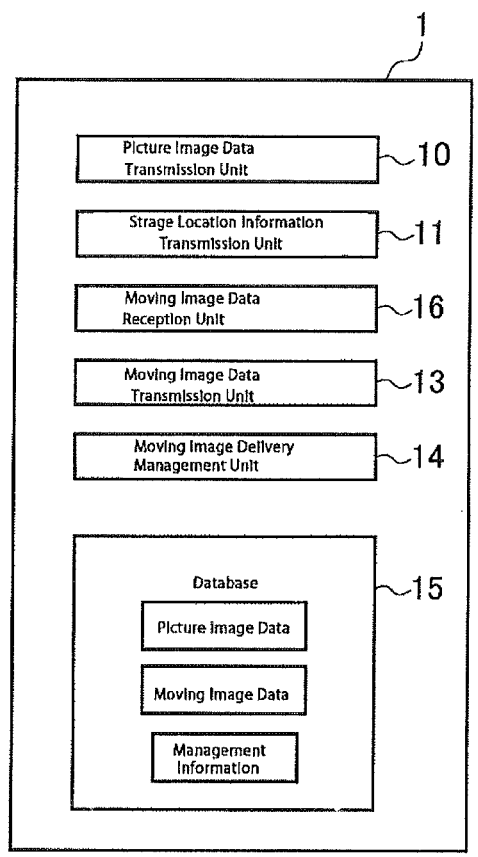
FIG. 15 is a block diagram of a server device.

FIG. 15 is a block diagram of the server device 1 according to this embodiment. The server device 1 according to this embodiment is constituted by omitting the terminal information acquisition unit 12 from the server device 1 illustrated in FIG. 3, and by adding a moving-image data reception unit 16. The terminal information acquisition unit 12 may be included in the server device 1 according to this embodiment.

The picture-image data transmission unit 10 transmits the picture image data to the image printing device 2 and the portable terminal 4. In an example, when the picture image data provided from a licenser is registered in the server device 1, the picture-image data transmission unit 10 transmits the registered picture image data to the image printing device 2. Furthermore, when the portable terminal 4 accesses the server device 1 in accordance with the storage location information, the picture-image data transmission unit 10 transmits the picture image data, which corresponds to the storage location information, to the portable terminal 4.

In response to a request from the image printing device 2, the storage location information transmission unit 11 generates the storage location information specifying a location (storage area) where the moving image data can be stored, and transmits the generated storage location information to the image printing device 2. The storage location information transmission unit 11 generates different storage location information for each request from the image printing device 2.

When the picture image is purchased by the user, the image printing device 2 requests the storage location information to the server device 1. At the time of requesting the storage location information, the image printing device 2 notifies information of the picture image, which has been purchased by the user, to the server device 1. The storage location information generated by the storage location information transmission unit 11 is registered as part of the management information in the database 15 in link with the information of the picture image purchased by the user, which has been notified from the image printing device 2.

The moving-image data reception unit 16 receives the moving image data from the portable terminal 4 that has accessed the server device 1 in accordance with the storage location information, and stores the received moving image data in a storage area of the database 15, the storage area being specified by the storage location information used in the access to the server device 1.

When the moving image data is stored, the storage location information, the picture image data, and the moving image data are linked with each other, and a correspondence relation among them is registered as part of the management information the database 15. In other words, the image data of the picture image purchased by the user, the storage location information generated in response to a request issued from the image printing device 2 upon the purchasing of the picture image data, and the moving image data uploaded from the portable terminal 4 in accordance with the generated storage location information are linked with one another.

The moving-image data transmission unit 13 transmits the moving image data to the portable terminal 4 in response to a request from the portable terminal 4. The moving image data transmitted to the portable terminal 4 corresponds to the storage location information that has been used in the access from the portable terminal 4. The first access from the portable terminal 4 in accordance with the storage location information is made for the above-mentioned uploading of the moving image data. Thus, the server device 1 transmits the moving image data in response to the second or subsequent access from the portable terminal 4 in accordance with the same storage location information.

The database (storage unit) 15 stores the picture image data, the moving image data, and the management information. The picture image data is provided, for example, from the licenser. The moving image data is registered by the user employing the portable terminal 4. The management information contains the correspondence relation among the storage location information, the picture image data, and the moving image data.

The database 15 includes at least one type of storage medium, such as a flash memory, a hard disk memory, a multimedia card micro-type memory, a card memory (e.g., an SD or XD memory), RAM, SRAM, ROM, EEPROM, PROM, or a magnetic memory.

The moving-image delivery management unit 14 refers to the management information and specifies, from the storage location information that has been given in the access from the portable terminal 4, the picture image data and the moving image data both corresponding to the relevant storage location information. The moving-image delivery management unit 14 may generate the storage location information.

Figure 16:
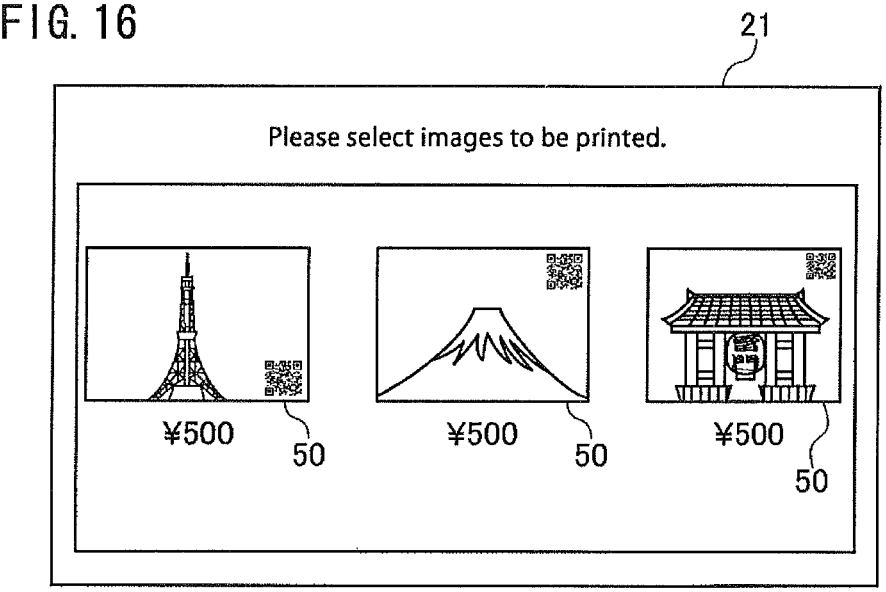
FIG. 16 illustrates an example of a display screen when a user purchases a picture image in the image printing device.

The image printing device 2 has the same configuration as that in the first embodiment, and description of the configuration of the image printing device 2 is omitted. As illustrated in FIG. 16, the image printing device 2 displays sample images 50 of the printed matter 3 on the touch panel 21. When the user selects one of the sample images to be purchased and pays a fee, the storage location information acquisition unit 27 acquires the storage location information from the server device 1.

The server device 1 generates a different kind of storage location information in response to each request from the image printing device 2. Accordingly, the two-dimensional code 32 is printed as a different type on each of the printed matters 3 that are formed by the image printing device 2.

Figure 17:
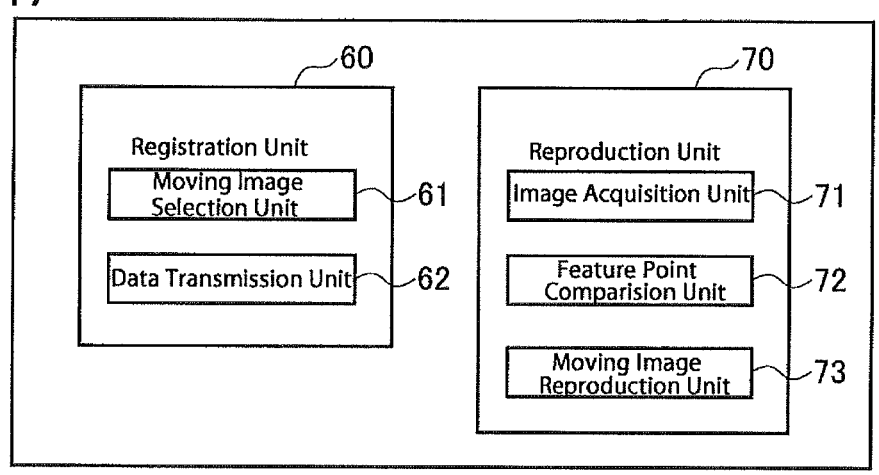
FIG. 17 is a functional block diagram representing function units that are implemented with execution of a moving-image reproducing application.

The portable terminal 4 has the same block diagram as that, illustrated in FIG. 8, in the first embodiment, and description of the block diagram of the portable terminal 4 is omitted. In this embodiment, with the CPU 40 in the portable terminal 4 executing the moving-image reproduction application, a registration unit 60 and a reproduction unit 70 are implemented, as illustrated in FIG. 17, such that the moving image data can be registered in the server device 1, and that the moving image can be acquired from the server device 1 and reproduced.

The registration unit 60 includes a moving-image selection unit 61 and a data transmission unit 62. The moving-image selection unit 61 accepts selection of the moving image data, which is stored in the memory 41, from the user. The data transmission unit 62 transmits the selected moving image data to the server device 1 via the communication unit 43.

The reproduction unit 70 includes an image acquisition unit 71, a feature point comparison unit 72, and a moving-image reproduction unit 73.

The image acquisition unit 71 reads the storage location information from the two-dimensional code 32, which is printed on the printed matter 3, with the camera 42, accesses the server device 1 via the communication unit 43, and acquires the picture image data linked with the relevant storage location information. Moreover, the image acquisition unit 71 acquires the picture image 31 on the printed matter 3 with the camera 42.

The feature point comparison unit 72 compares feature points between the picture image acquired from the server device 1 and the picture image 31 on the printed matter 3 photographed by the camera 42. If matching of the feature points is verified, the moving-image reproduction unit 73 receives the moving image data, which is linked with the storage location information, from the server device 1. In the case of mismatching of the feature points, a message notifying that the moving image cannot be reproduced is displayed on the display 45.

The moving-image reproduction unit 73 reproduces, by employing the known AR technique, the received moving image data in a superimposed relation to the picture image 31 photographed by the camera 42. In an example, positioning between the camera image and the moving image is performed by tracking the feature points of the detected picture image 31, and by estimating the position and the posture of the camera 42.

Figure 18:
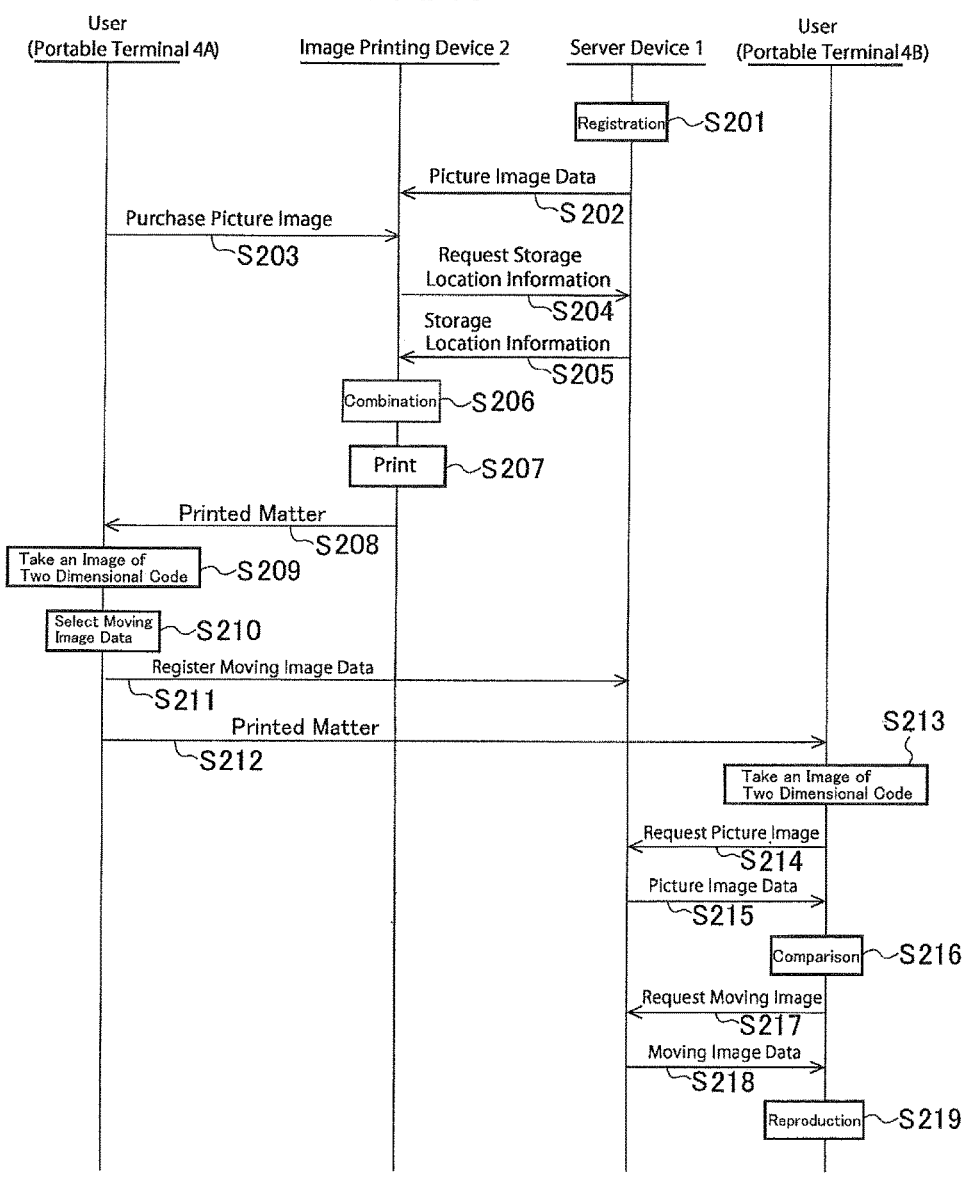
FIG. 18 is a sequence chart referenced to explain a moving-image data delivery method according to the second embodiment.

FIG. 18 is a sequence chart representing flow of processing for image selling and for registration and reproduction of the moving image according to this embodiment. The following description is made in connection with an example in which the user A registers the moving image in the server device 1 with the portable terminal 4A and the user B reproduces the moving image with the portable terminal 4B.

The picture image data to be sold is provided from the licenser, and the provided picture image data is registered in the database 15 (step S201). The server device 1 transmits the picture image data to the image printing device 2 (step S202). Timing of transmitting the picture image data to the image printing device 2 from the server device 1 can be set arbitrarily.

The transmitted picture image data is stored in the memory 25 of the image printing device 2. With the storage of the picture image data, the image selling by the image printing device 2 is started. The sample image display unit 26 displays the sample images 50 of the printed matters 3 on the touch panel 21, as illustrated in FIG. 16, by employing the picture image data.

When the user A operates the image printing device 2, purchases the picture image, and pays the fee (step S203), the storage location information acquisition unit 27 of the image printing device 2 notifies information of the picture image, which has been purchased by the user, to the server device 1, and requests, to the server device 1, the storage location information that specifies a location capable of storing the moving image data (step S204).

In response to the request from the image printing device 2, the server device 1 generates the storage location information and transmits the generated storage location information to the image printing device 2 (step S205). The server device 1 registers the generated storage location information and the information of the picture image, which has been purchased by the user and notified from the image printing device 2, in link with each other as part of the management information in the database 15.

When the image printing device 2 acquires the storage location information from the server device 1, the coding processing unit 28 generates a two-dimensional code image by coding the acquired storage location information. Then, the image combining unit 29 combines the two-dimensional code image with the picture image that has been purchased in step S203, and generates a combined image (step S206).

The printer 23 prints out the combined image on a sheet of printing paper (step S207). Thus, the user A can obtain the printed matter 3 on which the picture image 31, such as a landscape photo, and the two-dimensional code 32 are printed (step S208).

When the user A boots up the moving-image reproduction application in the portable terminal 4A, the camera 42 is started up and a prompt for instructing reading of the two-dimensional code is displayed on the display 45. The portable terminal 4A acquires the storage location information by taking an image of the two-dimensional code 32 on the printed matter 3 with the camera 42 (step S209).

The portable terminal 4A accesses the server device 1 upon acquiring the storage location information. Because the moving image data is not yet registered in the server device 1 in accordance with the relevant storage location information, the registration unit 60 of the portable terminal 4A starts a process of registering the moving image data.

The moving-image selection unit 61 accepts selection of the moving image data, which is stored in the memory 41 of the portable terminal 4A, from the user A (step S210). The data transmission unit 62 transmits the selected moving image data to the server device 1 in accordance with the storage location information (step S211). The server device 1 stores the received moving image data in link with the picture image data corresponding to the picture image, which has been purchased by the user A in step S203, and with the storage location information that has been transmitted from the server device 1 to the image printing device 2 in step S205. Thereafter, the user A assigns the printed matter 3 to the user B (step S212).

When the user B boots up the moving-image registration and reproduction application in the portable terminal 4B, the camera 42 is started up and a prompt for instructing reading of the two-dimensional code is displayed on the display 45. The portable terminal 4B acquires the storage location information by taking an image of the two-dimensional code 32 on the printed matter 3 with the camera 42 (step S213).

The portable terminal 4B accesses the server device 1 upon acquiring the storage location information. Because the moving image data is already registered in the server device 1 in accordance with the relevant storage location information, the reproduction unit 70 of the portable terminal 4B starts a process of reproducing the moving image data.

The image acquisition unit 71 requests, to the server device 1, the picture image data corresponding to the storage location information (step S214). The server device 1 transmits the picture image data corresponding to the storage location information, which has been given in the access from the portable terminal 4B, to the portable terminal 4B (step S215).

When the portable terminal 4B receives the picture image data from the server device 1, a prompt for instructing reading of the picture image 31 is displayed on the display 45. When the user B takes a photo of the picture image 31 on the printed matter 3 by the camera 42, the feature point comparison unit 72 compares feature points between the picture image received from the server device 1 and the picture image 31 photographed by the camera 42 (step S216). If matching of the feature points is verified, the portable terminal 4B requests the moving image data to the server device 1 (step S217).

The server device 1 transmits the moving image data corresponding to the storage location information, which has been given in the access from the portable terminal 4B, to the portable terminal 4B (step S218).

When the portable terminal 4B receives the moving image data, the moving-image reproduction unit 73 reproduces, by employing the known AR technique, the moving image data in a superimposed relation to the picture image 31 photographed by the camera 42 (step S219).

Thus, according to this embodiment, with the user taking a photo of the printed matter 3, which is output from the image printing device 2, by the portable terminal 4, the moving image data can be delivered to the portable terminal 4 such that the moving image is reproduced in a superimposed relation to the printed matter 3.

The moving image data can be registered in the server device 1 by the user himself or herself. Therefore, another user to whom the printed matter 3 has been assigned can enjoy not only the picture image printed on the printed matter 3, but also the moving image.

The server device 1 may determine a preservation period (e.g., 2 years) of the moving image data. When expiration of the preservation period is coming up, the server device 1 may notify the coming-up of expiration of the preservation period to the portable terminal 4 that has accessed the server device 1 in the past. The server device 1 may accept, from the portable terminal 4, prolongation of the preservation period or buying of the moving image data for a fee. Payment of the fee may be made, for example, as online payment using a credit card. When the user selects the prolongation of the preservation period, the server device 1 prolongs the preservation period of the registered data. When the user selects the buying of the moving image data, the server device 1 transmits the moving image data to the portable terminal 4 and deletes the relevant moving image data from the database 15. As a result, the moving image data, which will be no longer reproduced, can be avoided from remaining registered in the server device 1, and the database 15 in the server device 1 can be utilized efficiently.

When the server device 1 transmits the storage location information to the image printing device 2, the server device 1 may transmit printing position information of the two-dimensional code together. In such a case, the image printing device 2 receives the printing position information from the server device 1 together with the storage location information, and combines the two-dimensional code image with the picture image in accordance with the printing position information. By employing the printing position information, the two-dimensional code 32 can be avoided from interfering with the comparison of the feature points when the comparison of the feature points between the images is performed (step S216 in FIG. 18).

When the sample images 50 of the printed matter 3 are displayed on the touch panel 21 as illustrated in FIG. 16, the two-dimensional code in each of the sample images 50 is preferably provided as a two-dimensional code on the basis of dummy information. This makes it possible to prevent a fraudulent act of reading the two-dimensional code in the sample image 50, which is displayed on the touch panel 21, with the portable terminal and registering the moving image data.

The server device 1 may calculate the number of the printed matters 3, which have been sold, on the basis of the requests of generating the storage location information from the image printing device 2. Furthermore, the server device 1 may set an upper limit in the number of the printed matters 3 to be sold, and may limit the salable number of the printed matters 3. In an example, when the number of the printed matters 3 reaches the upper limit, the server device 1 notifies the image printing device 2 of the fact that the printed matters 3 have been sold out.

The server device 1 may limit the number of portable terminals, which are allowed to reproduce the moving image, by acquiring various kinds of information to specify each of the portable terminals 4 having accessed the server device 1 to reproduce the moving image, i.e., device information such as a maker, a setting language, a model name, an IP address zone, and a network segment, or by acquiring the identification information of the moving-image reproduction application that is installed in the portable terminal 4. In such a case, the server device 1 counts the number of the portable terminals 4 that have accessed the server device 1 by employing the same storage location information. After a counted value has reached an upper limit value, the server device 1 does no longer transmit the moving image data to a new portable terminal that is going to make an access by employing the same storage location information. As a result, copying and distribution of the printed matter 3 can be suppressed.

The image printing device 2 may change a unit price of the printed matter 3 depending on the case where the printed matter 3 containing the same image is purchased in a plural number, the case where different kinds of moving image data are registered in relation to one type of the printed matter 3, and the case where the same moving image data is registered in relation to the plurality of printed matters 3.

In the case where different kinds of moving image data are registered in relation to one type of the printed matter 3, the image printing device 2 requests, to the server device 1, the storage location information in the same number as that of the printed matters having been purchased. Then, the image printing device 2 outputs the plurality of printed matters 3 on which the different two-dimensional codes 32 are printed. The user can register different kinds of moving image data by reading the different two-dimensional codes 32 on the individual printed matters 3.

On the other hand, in the case where the same moving image data is registered in relation to the plurality of printed matters 3, the image printing device 2 requests one kind of storage location information to the server device 1. Then, the image printing device 2 outputs the plurality of printed matters 3 on which the same two-dimensional code 32 is printed. The user reads the two-dimensional code 32 on any one of the printed matters 3 with the portable terminal 4, and registers the moving image data. Thereafter, the common moving image can be reproduced each time the two-dimensional code 32 on any one of the printed matters 3 is read with the portable terminal 4. In the above case, the server device 1 may increase the number of terminals, which are allowed to reproduce the moving image, depending on the number of the printed matters 3 having been purchased.

The moving-image data delivery system may include the image printing device 2 in a plural number.

Third Embodiment

The above second embodiment has been described in connection with an example in which the server device 1 and the image printing device 2 are connected to each other to be capable of communication between them. However, the image printing device 2 may not include any means for communication with the server device 1.

In a third embodiment, the picture image data is written into the memory 25 of the image printing device 2, for example, by connecting, to the image printing device 2, a storage medium in which the picture image data is stored.

Figure 19:
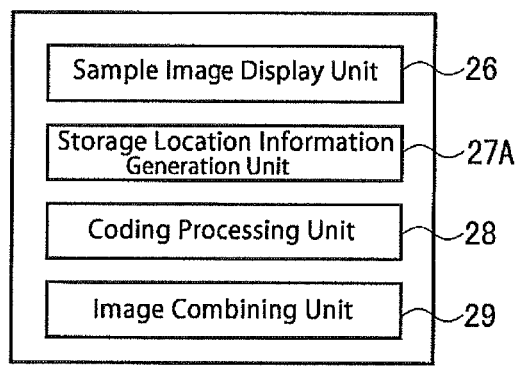
FIG. 19 is a functional block diagram representing function units that are implemented with execution of an image selling program in an image printing device according to a third embodiment.

As illustrated in FIG. 19, a sample image display unit 26, a storage location information acquisition unit 27A, a coding processing unit 28, and an image combining unit 29 are implemented with the CPU 20 of the image printing device 2 executing the image selling program, whereby selling of the printed matter 3 can be started. The storage location information generation unit 27A generates the storage location information by adding an additional digit number to a number (hereinafter called a "base number") specifying a storage area in the server device 1 where the moving image data can be stored. By changing the additional digit number each time the picture image is purchased, the printed matters 3 sold in the image printing device 2 include the two-dimensional codes 32 different from one another even though the picture images 31 on the printed matters 3 are the same. The individual moving image data are stored in different areas of the database 15 corresponding to the additional digit numbers through internal processing executed in the server device 1.

The additional digit numbers may be successive numbers, or numbers determined on the basis of processing time, for example. When the moving-image data delivery system includes the plurality of image printing devices 2, the additional digit number may include Number ID for each of the image printing devices 2. By setting the Number ID, the additional digit numbers added to the base number by the individual image printing devices 2 are made different from another, and generation of the same storage location information can be prevented.

With the image printing device 2 generating the storage location information as described above, a load for management of the storage location information in the server device 1 can be reduced. Furthermore, the number of the printed matters 3 having been sold can be managed by the image printing device 2 by setting an upper limit of the additional digit number to be issued.

The server device 1 is able to limit the number of portable terminals allowed to reproduce the moving image by registering, as part of the management information, both the storage location information that has been given in the access from the portable terminal 4 (specifically, the additional digit number contained in the storage location information) and the device information specifying the portable terminal 4, and by utilizing those items of information.

The base number used to generate the storage location information by the image printing device 2 is written into the memory 25, for example, by an operator operating the image printing device 2.

In the above second and third embodiments, when the moving image data is registered in the server device 1, a length of the moving image may be edited such that a data size of the moving image data is held to be not larger than a predetermined value. When the moving image data with a data size larger than the predetermined value is to be registered, an additional fee may be charged.

While the present invention has been described in detail using specific embodiments, it is apparent to those skilled in the art that a variety of modifications can be made without departing from the spirit and scope of the present invention.

Incidentally, this application is based on a Japanese patent application (Japanese Patent Application No. 2015-013379) filed on Jan. 27, 2015, and a Japanese patent application (Japanese Patent Application No. 2015-062762) filed on Mar. 25, 2015, which are hereby incorporated by reference herein in its entirety.

REFERENCE SIGNS LIST

1 Server device
2 Image printing device
3 Printed matter
4 Portable terminal

The invention claimed is:

1. An image printing device comprising:
a storage unit that stores picture image data;
a touch panel that displays sample images of the picture image data, and that accepts an order of purchasing the picture image data;
a storage location information generation unit that generates, upon accepting the purchasing order, storage location information of moving image data in a server device, the moving image data corresponding to the picture image data;
a coding processing unit that generates a code image by coding the storage location information;
an image combining unit that generates a combined image by combining the picture image data and the code image; and
a printer that prints out the combined image on a sheet of printing paper;
wherein the storage location information generation unit generates the storage location information by adding an additional digit number, which is different for each purchasing order, to a base number that enables a storage location of the moving image data to be specified.

2. A server device transmitting picture image data to an image printing device, and transmitting, to a portable terminal, moving image data corresponding to the picture image data,
the server device comprising:
a storage unit that stores the picture image data and the moving image data;
a picture-image data transmission unit that transmits the picture image data to the image printing device;
a storage location information transmission unit that transmits storage location information of the moving image data to the image printing device in response to a request from the image printing device; and
a moving-image data transmission unit transmitting the moving image data to the portable terminal that has read, from a printed matter on which the picture image data and a code image obtained by coding the storage location information are printed by the image printing device, the code image, that has acquired the storage location information from the read code image, and that has accessed the server device,
wherein the storage unit stores management information that sets plural kinds of storage location information corresponding to one kind of moving image data, and
the storage location information transmission unit transmits a different kind of storage location information in response to each request from the image printing device.

3. The server device according to claim 2, wherein the moving-image data transmission unit transmits the moving image data to the portable terminal when feature points of a picture image read from the printed matter by the portable terminal and feature points of the picture image data stored in the storage unit are in match with each other.

4. The server device according to claim 2, further comprising a terminal information acquisition unit that acquires terminal information of portable terminals having accessed the server device,
wherein the management information contains an upper limit value set for a number of portable terminals that are allowed to reproduce a moving image by employing one kind of storage location information, and
the server device counts, on the basis of the acquired terminal information, a number of portable terminals that have accessed the server device by employing one kind of storage location information, and does no longer transmit the moving image data to a new portable terminal that is going to make an access by employing the same one kind of storage location information after a counted value has reached the upper limit value.

5. The server device according to claim 2, wherein the storage unit stores plural kinds of moving image data corresponding to one kind of moving image data,
the management information contains a reproduction condition set for each kind of moving image data, and
the moving-image data transmission unit transmits the moving image data, which satisfies the reproduction condition, to the portable terminal.

6. The server device according to claim 5, wherein at least one of access time and a position of the portable terminal is defined as the reproduction condition.

7. An image printing device comprising:
a storage unit that stores picture image data;
a display unit that displays sample images of the picture image data;
an accepting unit that accepts an order of purchasing a printed matter published using the picture image data;
a storage location information generation unit that generates storage location information, which specifies a location capable of storing moving image data in the server device, upon accepting the purchasing order;
a coding processing unit that generates a code image by coding the storage location information;
an image combining unit that generates a combined image by combining the picture image data and the code image; and
a printer that prints out the combined image on a sheet of printing paper,
wherein the storage location information generation unit generates the storage location information by adding an additional digit number, which is different for each purchasing order, to a base number that specifies the location capable of storing the moving image data.

* * * * *